Nov. 5, 1935.  J. J. HUEBSCHER  2,019,976

TRAFFIC CONTROL SYSTEM

Filed March 2, 1935   5 Sheets—Sheet 1

INVENTOR
JOHN J. HUEBSCHER
BY Paul, Paul + Moore
ATTORNEYS

Fig.2

Nov. 5, 1935.  J. J. HUEBSCHER  2,019,976

TRAFFIC CONTROL SYSTEM

Filed March 2, 1935  5 Sheets-Sheet 3

INVENTOR
JOHN J. HUEBSCHER
BY Paul, Paul & Moore
ATTORNEYS

Nov. 5, 1935.  J. J. HUEBSCHER  2,019,976

TRAFFIC CONTROL SYSTEM

Filed March 2, 1935  5 Sheets—Sheet 4

INVENTOR
JOHN J. HUEBSCHER
BY Paul, Paul & Moore
ATTORNEYS

Nov. 5, 1935. J. J. HUEBSCHER 2,019,976
TRAFFIC CONTROL SYSTEM
Filed March 2, 1935   5 Sheets-Sheet 5

INVENTOR
JOHN J. HUEBSCHER
BY
ATTORNEYS

Patented Nov. 5, 1935

2,019,976

UNITED STATES PATENT OFFICE 2,019,976

TRAFFIC CONTROL SYSTEM

John J. Huebscher, Minneapolis, Minn.

Application March 2, 1935, Serial No. 9,083

16 Claims. (Cl. 177—311.5)

This invention relates to new and useful improvements in traffic control systems generally.

Since the advent of the high speed automobile, traffic control has become one of the most difficult problems of the present day. Automobiles are now designed to travel at extremely high speeds, many being capable of traveling at from seventy to ninety miles per hour, with perfect ease and comfort. It is obvious that when an automobile is driven at such a high rate of speed, particularly when approaching crossings, villages, and other areas, accidents are likely to occur because of the inability of the driver to control the car, or bring it to a quick stop, should an object suddenly appear in the path of the vehicle.

Numerous attempts have heretofore been made to control speeding and reckless driving of automobiles by the use of various types of traffic control systems and apparatus, but to the best of my knowledge, these have proven unsuccessful, primarily because such systems have depended upon the driver to heed a dormant warning signal and thereafter retard the movement of his car, or bring it to a complete stop, if necessary. Many drivers of automobiles have a strong leaning towards recklessness, and to force such drivers to comply with traffic regulations, other steps must be taken. The constantly increasing death toll, and number of persons injured annually, as well as the enormous destruction of property caused by automobile accidents, is conclusive evidence that all drivers cannot be depended upon to operate their cars at a speed which may be considered safe, regardless of the number of present day warning signals and signs which may be placed along highways to warn them of dangerous crossings and other areas where carefulness must be exercised.

To eliminate such reckless speeding when approaching fixed road hazards, such as curves, blind corners, railroad grade crossings, and areas or zones such as rural villages, means must be provided which will positively compel all chronic offenders of speed laws to observe such laws, when approaching road hazards and restricted areas, and which will, if necessary, cause their cars to be brought to a complete stop. It is therefore, the purpose of this invention, to provide a traffic control system which does not depend entirely upon the driver to retard the movement of his car or bring it to a complete stop, when approaching a dangerous crossing, or a zone or area having a restricted speed limit, but which will automatically compel the offending vehicle to be brought to a safe speed or a stop, regardless of any actions upon the part of the driver.

An important object of the present invention, therefore is to provide an improved traffic control system which may be used in all locations or areas where traffic must be controlled, whether it is an approach to a railroad grade crossing, a village along a highway, a school district, or upon entering all cities of first class, at semaphores, or any other area or zone where traffic must be limited to within a predetermined speed to avoid accidents and assure reasonable and safe speeds in dangerous areas.

A further object of the invention is to provide a traffic control system which will automatically govern the maximum velocity of cars at any particular point or in any particular zone; which will sound an alarm when a violation occurs; will interrupt the ignition circuit of the automobile in the event the driver does not retard the speed of the vehicle to that allowed within a predetermined district or zone, thereby automatically slowing up or stopping the offending car; which will make visible on the windshield, the maximum speed at which the car is capable of traveling, when passing through a restricted area or zone; will permit unlimited speed under all conditions, except where control is deemed advisable; can compel stops at railroad grade crossings, or other points where stops are deemed necessary to avoid accidents; and which will enable any city, town, or built up area to control maximum operating speeds within its jurisdiction at very low cost.

A further object is to provide a speed control device conveniently mounted upon the vehicle and having a connection with the usual fuel supply to the engine, such as the carburetor, or the governor used in connection therewith, which may be conveniently operated from the driver's seat to thereby limit the supply of fuel to the engine, whereby the vehicle cannot exceed a predetermined speed, said speed control device being visibly mounted, whereby it may be conveniently viewed by pedestrians and other drivers to apprise them of the maximum speed at which the vehicle may be driven.

A further object resides in the provision of a speed control device within the vehicle which is operatively associated with the ignition circuit of the engine and is adapted to be automatically actuated by means in the highway, in the event the automobile travels over a predetermined point in the highway at an excessive or dangerous speed, whereby the ignition circuit may be automatically interrupted for a predetermined time interval, and at the same time, an alarm is sounded within the vehicle, warning the driver that he has committed a traffic violation and thereby compelling him to slow down his car or bring it to a complete stop before he can proceed on his journey.

Other objects reside in the particular arrangement of the various operating devices of the system along the highway or road bed, whereby all cars traveling in a given direction must pass over said operating devices, said devices, however, being so arranged and interconnected that all vehicles passing thereover within a predetermined or safe speed, will not be affected thereby, but any vehicle passing thereover at an excessive or dangerous speed will cause said operating devices to function and thereby actuate the speed control device on the offending vehicle, whereby the speed of the vehicle is automatically reduced, and, in some instances, the ignition circuit thereof may be completely interrupted; in the magnetic control means provided in the surface of the highway adapted to automatically actuate the speed control means on the vehicle, in the event the vehicle travels over a certain area at an excessive speed; in the novel construction of the warning signal located at a convenient point along the highway, whereby it may readily be seen by all vehicles traveling over the highway; in the portability and interchangeability of said warning signal, whereby a signal bearing certain information may readily be removed and another one substituted therefor, when it is desired to change the information appearing on the face of the signal, and also whereby the signal may readily be removed for repairs, when necessary; in the provision of a traffic control system which does not, in any way, interfere with or retard the movement of vehicles traveling over a given area or zone within a predetermined speed limit, but which will automatically retard or bring to a stop, all vehicles attempting to travel over said given area or zone at an excessive speed; in the means whereby the system may be quickly adapted for manual control, whereby an officer or authorized person may be stationed along the highway and by the simple manipulation of a small control lever, cause all or any selected vehicle passing over a certain area or zone, to be brought to a stop; and, in the particular construction and arrangement of the various control devices employed in the system, which are of such a nature that they may readily be installed along a highway at a comparatively small cost.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figures 1, 11, 12, 13:
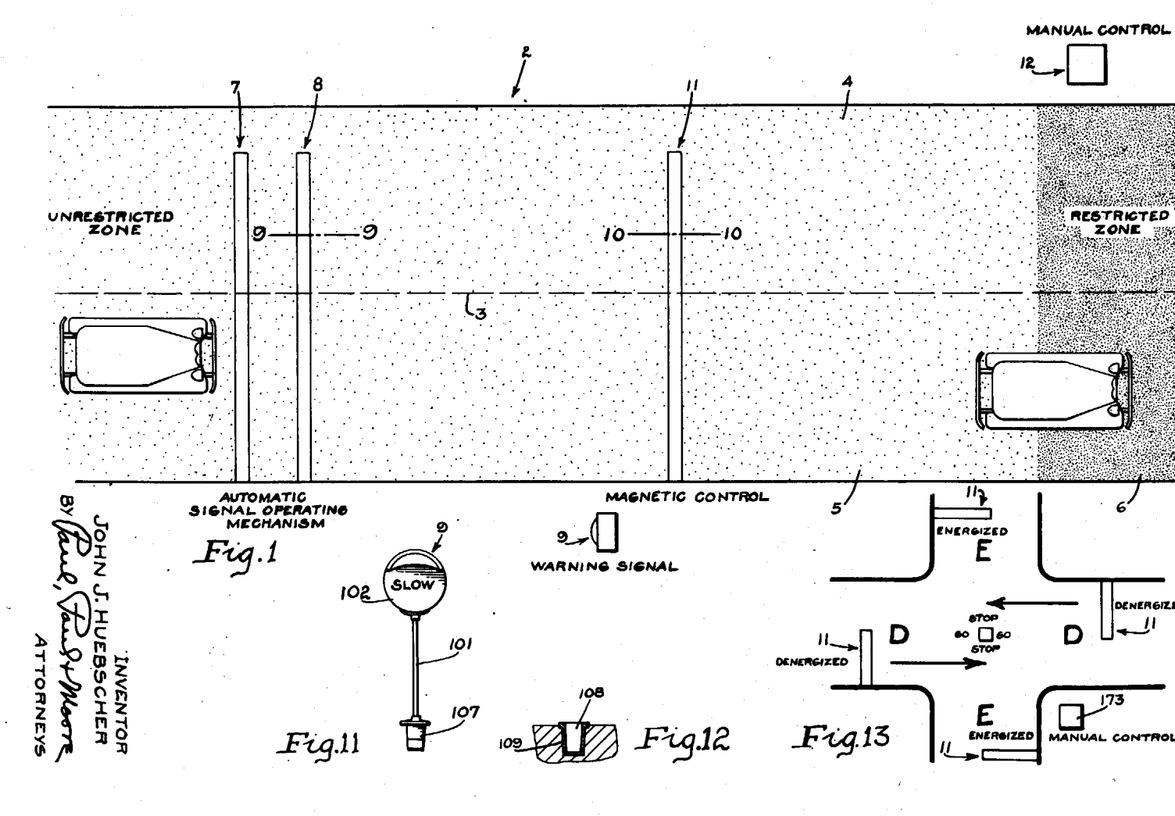
Figure 1 is a schematic view showing the general arrangement of the various control devices along a highway.
Figure 11 is a view showing the warning signal removed from its socket.
Figure 12 is a cross-sectional view of the socket for supporting the warning signal.
Figure 13 is a view diagrammatically illustrating the invention used in connection with a conventional "stop" and "go" semaphore.

In the selected embodiment of the invention here shown, there is illustrated in Figure 1, a portion of a highway, generally indicated by the numeral 2, shown divided longitudinally by a line 3, whereby two lanes 4 and 5 are provided. The heavily shaded portion 6 at the right hand end of the figure indicates a restricted zone or area in which the speed of all traffic must be slowed down to a safe speed as, for example, thirty miles per hour. The remaining portion of the highway represents an unrestricted area over which traffic may travel at high speed.

System in general

Briefly, the primary purpose of the present invention is to provide means operable in connection with a highway or other lane of travel for positively causing all automotive vehicles approaching certain areas or zones, such for example, as railroad grade crossings, school zones, street intersections, or other areas where it is deemed necessary to slow down traffic, which will positively cause all vehicles approaching said restricted areas or zones, to be retarded or slowed down to within a predetermined safe speed whereby the driver may readily bring his car to a complete stop, should an object suddenly appear in the path before him.

The apparatus herein disclosed is adapted for either automatic or manual operation. As illustrated in Figure 1, it is shown comprising a pair of operating mechanisms, generally indicated by the numerals 7 and 8, embedded in the surface of the highway and extending from one side thereof in a direction crosswise of the highway or road bed, whereby all vehicles traveling in one direction must pass over them. These operating mechanisms, which will subsequently be described in detail, are engaged by and actuated by the wheels of the vehicle, when the latter passes over them. If a vehicle passes over these mechanisms at an excessive speed, they will cause a warning signal, generally indicated by the numeral 9, and stationed at a conspicuous location along the highway, to operate and warn the driver that he is approaching a restricted zone at an excessive or dangerous speed, and that he must reduce his speed before entering the restricted zone.

A control device 11 is also embedded in the surface of the highway, and is located between the operating mechanisms 7 and 8 and the restricted zone 6. This control device operates in conjunction with the operating mechanisms 7 and 8 to automatically sound an alarm within the vehicle, if the driver fails to reduce his speed when approaching a restricted zone or area, to thereby warn him that he is violating a traffic law, and in some instances, it may automatically cause the ignition circuit of the engine to be opened, whereby the power of the vehicle is momentarily cut off, so that the driver must come to a full stop, at or about the time that he reaches the restricted zone, indicated by the numeral 6.

The manual control, generally indicated by the numeral 12, is preferably located adjacent to the restricted zone, whereby an officer or other authorized person may manually control the operation of the magnetic rail 11 and thereby control the traveling movement of all vehicles approaching the restricted zone, regardless of speed. This manual control may be used only in emergencies, and will be found of particular value when, for some reason, it may be deemed advisable to temporarily halt all vehicles as, for example, when entering or leaving a city. If deemed necessary, the manual control may be so positioned as to cause the magnetic rail to be energized continuously for days at a time, which may be found advisable in some instances, and when used with certain types of signals. Ordinarily, the manual control is not used.

*Speed control device 13*

One of the most important features of the present invention resides in the construction and arrangement of the speed control device, generally indicated by the numeral 13, and shown in detail in Figures 3 to 7, inclusive. This speed control is mounted where it may be conveniently operated by the driver of the vehicle, and is operatively connected to the usual governor or fuel supply means of the vehicle engine. It is now quite common to provide automobile engines with means for limiting the fixed supply of fuel thereto, whereby the vehicle cannot be driven beyond a fixed predetermined speed. This fuel control means may be in the form of a governor associated with the usual carburetor of the engine, or it may consist of an adjustable stop for limiting the movement of the engine throttle. To increase or decrease the maximum speed at which the vehicle may travel, it is necessary to readjust the governor or adjustable stop of the carburetor which, in the past, has necessitated lifting the engine hood and getting out of the vehicle and, with the use of a suitable instrument, readjust said governor or stop. In the structure herein disclosed, the fuel limiting means above referred to, is operatively connected to the speed control device 13, whereby these devices may be conveniently adjusted from the driver's seat without getting out of the vehicle.

Figures 5, 6:
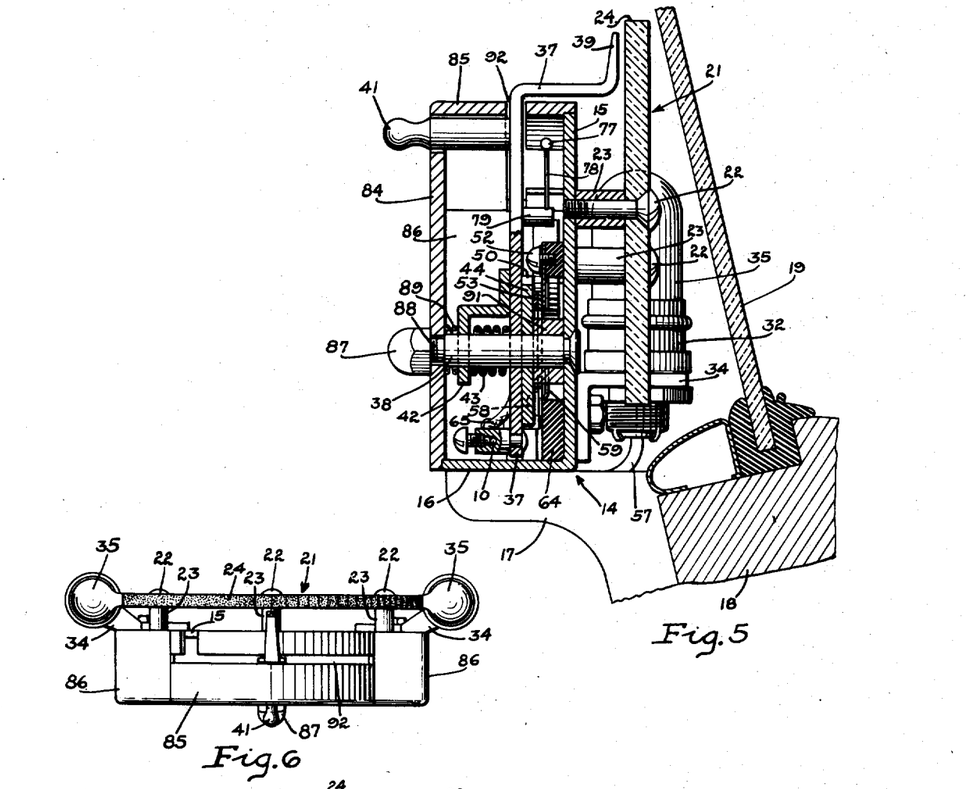
Figure 5 is a vertical sectional view on the line 5—5 of Figure 3.
Figure 6 is a plan view of Figure 5.

The speed control device 13 is shown comprising a frame, generally indicated by the numeral 14, and comprising an upright plate portion 15 and a horizontal lower portion 16. The frame 14 may be mounted upon a suitable bracket 17, secured to the frame or cowl 18 of the vehicle body adjacent to the usual windshield 19, as best shown in Figure 5. A panel of transparent material such as glass, is supported upon the upright wall 15 of the frame 14 by suitable studs 22, and is shown spaced therefrom by spacing collars 23, whereby the panel 21 is positioned forwardly of the wall 15 in spaced parallel relation thereto.

Figure 7:
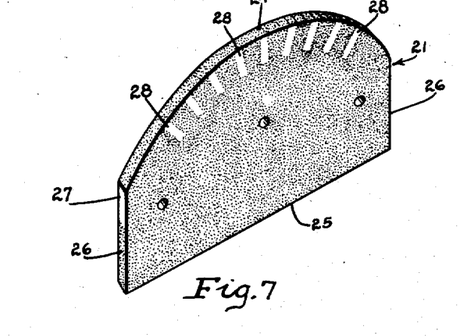
Figure 7 is a perspective view of the illuminated panel of the speed control device.

The panel 21 is heavily frosted on both sides, and its upper and lower edges 24 and 25 are similarly frosted, as best shown in Figure 7. Portions at the end edges 26 are also frosted, as indicated at the left hand side of Figure 7, whereby unfrosted portions 27 are provided at the upper portions of said end edges for purposes which will subsequently be described. Non-frosted portions 28 are also provided upon the opposite side faces of the panel 21 and are radially disposed with respect to the upper curve or rounded edge 24, and are equally spaced apart and cooperate to provide a series of speed indicating marks, as will subsequently be described.

Suitable light bulbs 29 and 31 are mounted in sockets 32 and 33, respectively, secured to the rear wall 15 of the frame 14 by brackets 34. These sockets are disposed in the medial plane of the panel 21, as best shown in Figures 4 and 6. Suitable housings 35 are detachably secured to the sockets 32 and 33 and normally completely conceal the light bulbs 29 and 31, as will readily be understood by reference to Figure 3. A small window or opening 36 is provided in each casing 35, and these openings are alined with the non-frosted surfaces 27 of the panel 21, whereby when the light bulbs are illuminated, rays of light will be projected therefrom through the windows or openings 36 into the panel 21, thereby illuminating the interior of the panel, whereby the device may readily be seen by the driver, and by pedestrians and approaching motorists, either day or night. The lights 29 and 31 are preferably of different colors as, for example, the light 29 at the left hand side of the instrument, may be yellow or green, while the light 31 at the right hand side is preferably red, or some other clearly visible color.

A suitable arm 37 is loosely mounted upon a fixed shaft or stud 38, and has its upper end offset and shaped to provide a pointer 39, positioned in close proximity to the panel 21, whereby it cooperates with the marks 28 on the panel to indicate the position at which the fuel limiting means of the carburetor is set. A suitable connection 10, such as piano wire, operatively connects the lower end of the arm 37 to the fuel limiting means of the carburetor, generally indicated by the numeral 20 in Figures 2 and 8. The connection 10 may be supported within a suitable flexible conduit 30, as is common with connections of this type. The arm 37 has a suitable finger grip 41, whereby it may be conveniently swung from its normal inoperative position, shown in full lines in Figure 3, to an operative position, as indicated in dotted lines in the same figure. To provide a suitable bearing for the arm 37 upon the stud 38, a bracket 42 is shown suitably secured to the arm which has one end apertured to receive the stud 38, as best shown in Figure 5. The arm 37 is normally retained in the position shown in Figure 3, by the action of a suitable spring 43, shown coiled about the stud 38 and having one end secured to a ratchet disk 44 by a screw 45, and its opposite end 46 bearing against a stud 47 suitably secured to the upright wall 15 of the frame 14. The disk 44 is suitably secured to the pointer 37 as, for example, by welding, whereby it rotates as a unit therewith.

Figure 2:
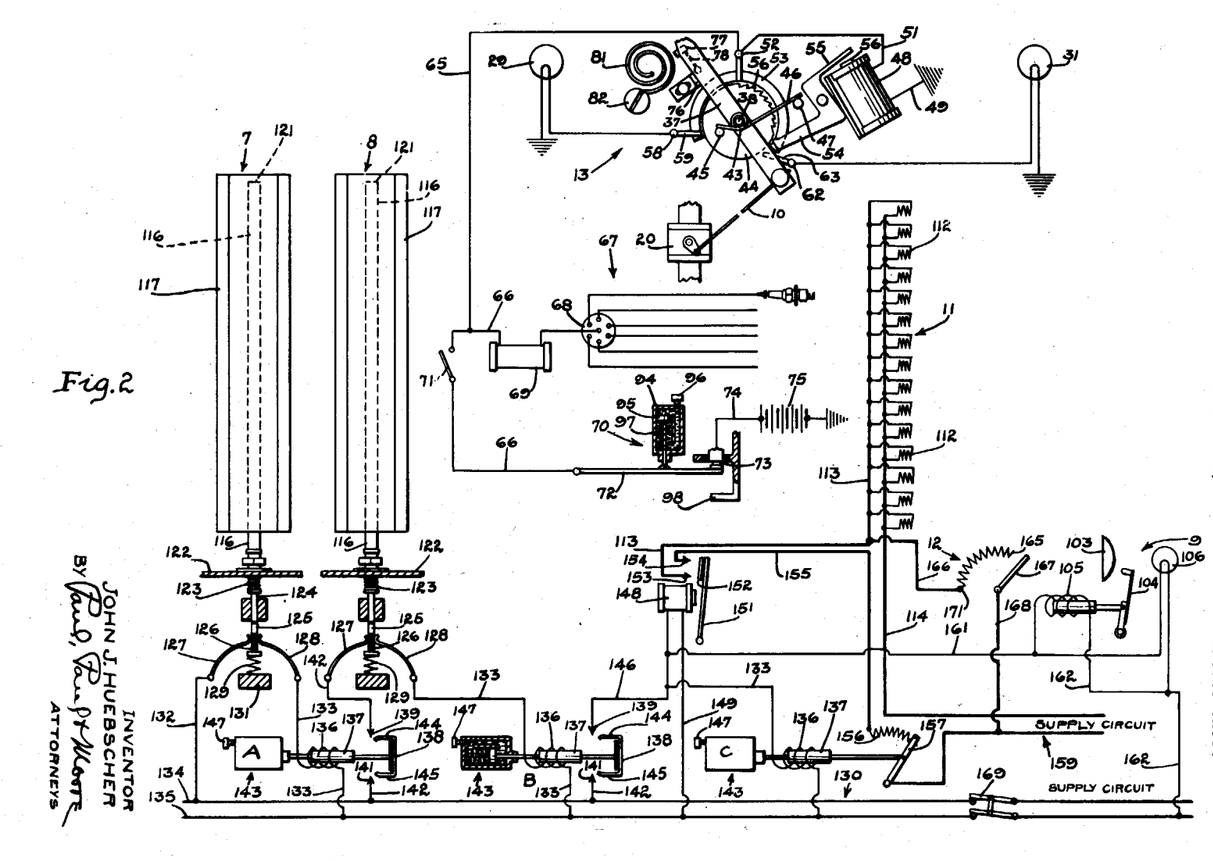
Figure 2 is a wiring diagram showing the electrical connections between the various control devices along the highway, and also the electrical connections between the control devices on the vehicle and the ignition circuit of the engine.
Figure 3:
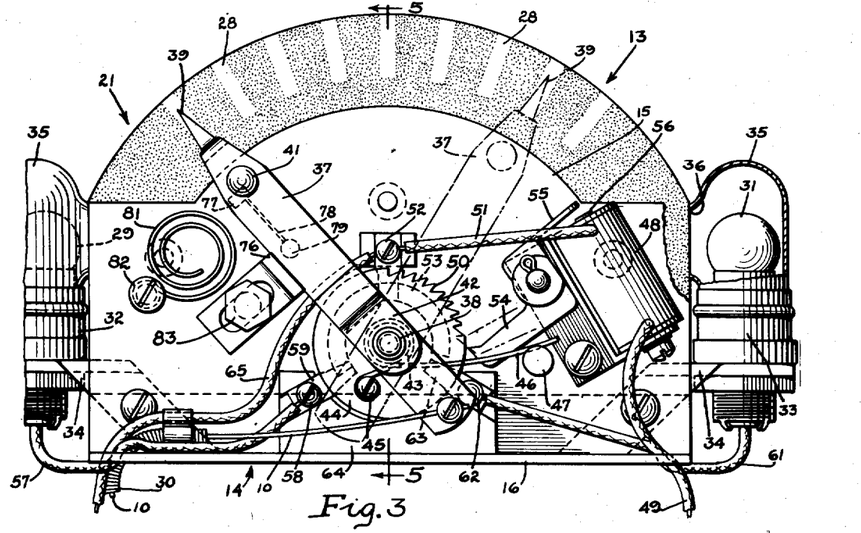
Figure 3 is an elevational view of the speed control device mounted within the vehicle, with the casing removed.
Figure 4:
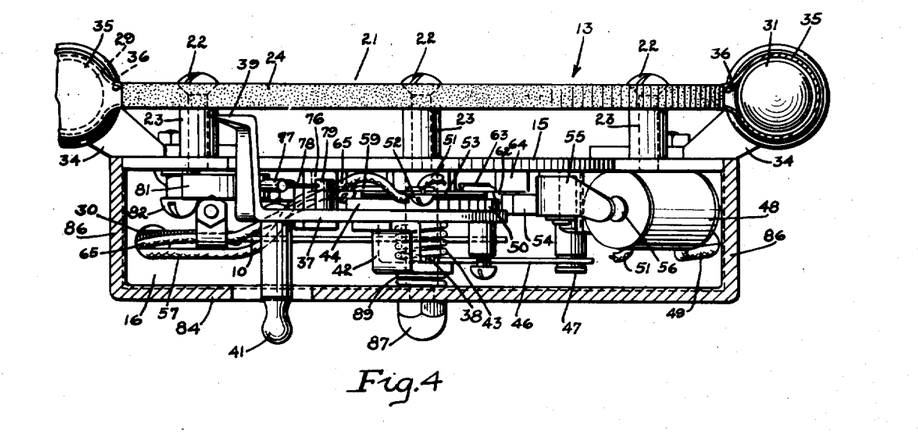
Figure 4 is a plan view of Figure 3, partially broken away to more clearly show the interior construction thereof.

The means for temporarily locking the arm 37 in adjusted position, as shown in dotted lines in Figure 3, is shown comprising a solenoid coil 48 suitably supported on the rear wall 15 of the frame 14, and having a wire 49 leading therefrom which may be grounded as diagrammatically illustrated in Figure 2. The other wire 51 of the coil 48 is connected to a terminal 52 which is electrically connected to an arcuately formed bus bar secured to the back face of the disk 44, as indicated in dotted lines in Figure 3. This bus bar is suitably insulated from the disk 44 to prevent the conduction of current from the bus bar to the disk.

A pawl 54 is mounted for pivotal movement adjacent to the coil 48, and has an end portion 55 overhanging the coil 48 and adapted to be attracted by the core 56 thereof, when the coil is energized, whereby the pawl 54 is moved into peripheral engagement with the disk 44, so that when the arm 37 is rotated in a direction from the full to the dotted line position, shown in Figure 3, the pawl 54 will lockingly engage the ratchet teeth 50 and thereby prevent the arm from returning to its normal full line position, shown in Figure 3, during the period that the coil 48 is energized. When the coil 48 is deenergized, the ratchet will drop out of locking engagement with the ratchet teeth 50, whereupon the spring 46 will instantly return the arm 37 to its normal full line position shown in Figure 3. In some instances, it may be necessary to provide spring means for positively moving the pawl 54 out of locking engagement with the ratchet teeth 50 when the coil 48 is deenergized.

In Figure 3, I have shown the light bulbs 29 and 31 as being of the single contact type, whereby the base portions thereof are grounded to the sockets 32 and 33 in the usual manner. To illuminate the light bulbs, the yellow light 29 is shown having a wire 57 leading therefrom to a terminal screw 58 having a spring contact clip 59 secured thereto, one end of which is positioned in the path of the bus bar 53. A similar wire 61 connects the bulb 31 with a terminal 62 having a spring contact clip 63 secured thereto, which has one end positioned in the path of the bus bar 53, as clearly shown in Figure 3. The contact clips 59 and 63 are preferably mounted upon a suitable insulating block 64 which may be secured to the upright wall 15 of the frame 14, and their inner end portions are so disposed with respect to the bus bar 53 that when the arm 37 is in the full line position shown in Figure 3, one end of the bus bar will electrically engage the contact clip 59, whereby current will flow from the bus bar through the wire 57 to the yellow light bulb 29 and thereby illuminate the latter. When the arm is positioned as shown in full lines in Figure 3, it will be noted that the opposite end of the bus bar 53 is out of engagement with the contact clip 63, whereby the red light 31 is extinguished.

To complete the circuit to the solenoid 48, the terminal screw 52 is shown connected by a wire 65 to a wire 66 of the ignition circuit, generally indicated at 67 in Figure 2, and in which 68 indicates the usual distributor and 69 the high tension coil. The usual ignition switch 71 is shown interposed in the wire 66, one end of which is electrically connected to a circuit breaker, generally indicated by the numeral 70, and which will subsequently be described.

Means is provided in the construction of the speed control device 13, whereby whenever said device is actuated and the arm 37 is returned to its normal position against a suitable stop 76, shown in Figure 3, an alarm is sounded within the vehicle to warn the driver that he must reduce the speed of his car. Such means is clearly illustrated in Figure 3, and comprises a small hammer 77 supported on a resilient arm 78 secured to the arm 37, as indicated at 79 in Figure 3. The hammer 77 is adapted to strike a gong 81 secured to the upright wall 15 of the frame 14 by a suitable screw 82. The hammer 77 is so mounted with respect to the gong 81 that when the arm 37 is returned to its normal position against the stop 76 by the spring 43, the hammer will strike the gong 81 and sound an alarm which may readily be heard throughout the interior of the vehicle, which, as above stated, is a warning to the driver that the must slow down the speed of his car. The stop 76 is adjustably mounted upon the upright wall 15 by a suitable bolt 83.

A suitable housing 84, having top and end walls 85 and 86, respectively, is secured to the upright wall 15 to conceal the operating parts of the speed control device 13, as will readily be understood by reference to Figures 5 and 6. The housing 84 is shown retained in position by means of a nut 87 received in threaded engagement with the reduced end portion 88 of the stud 38. A suitable compression spring 89 is shown interposed between the bracket 42 and the front wall of the housing 84, to thereby retain the arm 37 in proper position upon the stud 38, and whereby the central portion of the inner face of the ratchet disk 44 is supported against a spacing collar 91, interposed between said disk and the rear wall 15 of the apparatus, as best shown in Figure 5. The housing 84 has a suitable slot 92 in its upper wall 85 for receiving the arm 37, and whereby the latter may be oscillated with respect to the illuminated dial or panel 21, as will readily be understood by reference to Figure 6. A suitable slot 41' is also provided in the housing 84 for the handle 41.

Ignition interrupting means

Figure 8:
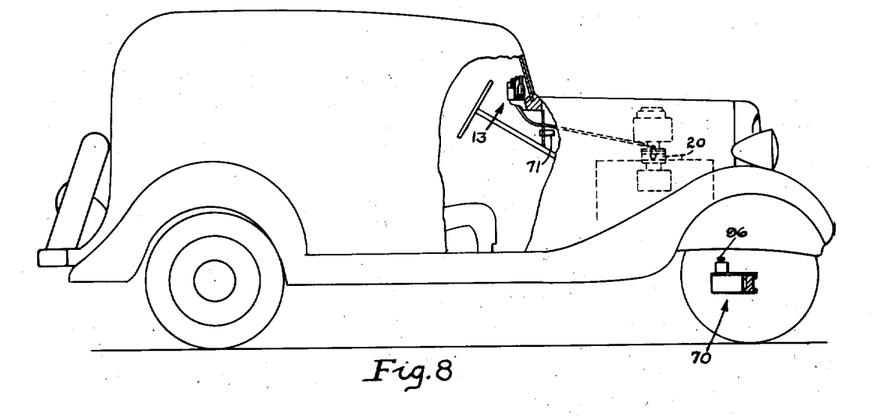
Figure 8 is a diagrammatic view of a conventional automobile showing the relative positions of the control devices thereon.

Means is provided for momentarily or temporarily interrupting the ignition circuit of the engine, in the event the driver does not slow down to the permitted speed, when the warning signal 9 is sounded, and whereby his car may, in some instances, be brought to a complete stop. The means for thus interrupting the ignition circuit, is diagrammatically illustrated in Figure 2, and comprises a circuit breaker, generally indicated by the numeral 70. This circuit breaker is shown comprising a movable member 72 having its swinging end normally engaging a fixed contact 73 which, in turn, has a wire 74 connecting it to one side of the usual battery 75 of the vehicle. The other terminal of the battery is shown grounded to the vehicle frame, whereby a complete circuit is provided for the solenoid coil 48 and light bulbs 29 and 31 of the speed control device 13. The circuit breaker 70 is mounted upon the vehicle, preferably rearwardly of the front axle, as shown in Figure 8, and may be secured directly thereto, or to some other fixed portion of the vehicle chassis, whereby it may be actuated by the magnetic rail 11, as will subsequently be described.

The circuit breaker 70 is shown provided with means for delaying the closing movement of the contact arm 72, when said movable arm has been moved to a circuit opening position. Such means may consist of a dash pot 94 having a spring-actuated plunger 95 therein, and an adjusting screw 96 for controlling the by-passing of the fluid from the upper end of the dash pot to the lower portion thereof. A suitable spring 97 is shown interposed between the plunger 95 and the lower wall of the dash pot for moving the plunger 95, and therefore the contact arm 72 upwardly. Adjustment of the screw 96 controls the return movement of the contact member 72 to thereby vary the time interval that the ignition circuit is open. A suitable stop 98 is positioned in the path of the contact arm 72 to limit its downward movement, when said arm is actuated by the magnetic rail 11. The circuit breaker 70 also controls the operation of the speed control device 13, as will readily be seen by reference to Figure 2, wherein it will be noted that the current supply wire 65 of the device 13 is connected to the wire 66 of the ignition circuit. Thus, each time the circuit breaker 70 is opened, the speed control device 13 is actuated and automatically resets or readjusts the feed supply means of the vehicle engine for a safe speed.

Warning signal 9

The warning signal 9 is briefly illustrated in Figures 1, 2, 11, and 12, and is shown comprising a standard 101 having a casing 102 mounted at the upper end thereof, in which is mounted a suitable gong 103 arranged to be struck by a hammer 104, adapted to be actuated by a solenoid coil 105, diagrammatically illustrated in Figure 2. A light bulb 106 may be provided within the casing 102 for the purpose of illuminating the front face thereof, whereby the information appearing thereon, such as the word "slow", may more readily be seen. The light bulb 106 may be arranged to project its rays against a suitable reflector 108, which, in turn, will project the light downwardly against the face of the signal 9.

The lower end of the standard 101 of the signal is shown provided with a depending portion 107 adapted to be removably received in a socket 108 formed in a suitable casting 109, which may be embedded in the concrete or suitably supported along the highway. The socket 108 is provided with suitable electrical connections, not shown, adapted to be engaged by contacts, not shown, on the depending portion 107 of the standard 101, so that when the portion 107 is inserted in the socket 108, the warning signal will be operatively and electrically connected into the system. The specific construction of the warning signal and the supporting means therefor, forms no part of the present invention and it is therefore thought unnecessary to further describe the same herein. The signal 9, however, does form an important part of the system, as a whole.

Magnetic rail or control 11

Figure 10:
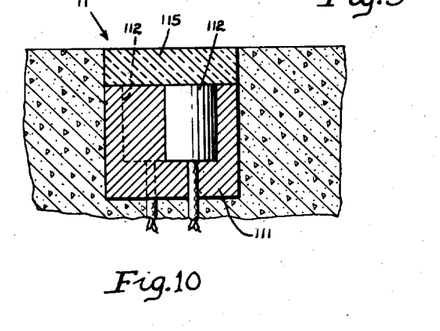
Figure 10 is an enlarged cross-sectional view on the line 10—10 of Figure 1, showing the magnetic control device embedded in the surface of the highway.

The magnetic rail or control 11 constitutes another important feature of the traffic control system herein disclosed, and is shown comprising a suitable supporting member 111 adapted to support a series of magnetic coils 112, each electrically connected to a pair of wires 113 and 114. The coils 112 are suitably insulated from the supporting member 111, and a suitable plate 115 of insulating material is seated upon the member 111 and provides a closure for the coils 112, as clearly illustrated in Figure 10. When the coils 112 are energized, as will subsequently be described, and a vehicle passes over the magnetic rail 11, the switch arm 72 of the circuit breaker 70 is attracted thereby and is momentarily pulled out of electrical engagement with the contact 73, thereby breaking the ignition circuit of the engine and, at the same time, deenergizing the coil 48 of the speed control device 13, whereby the arm 37 of said device is released, as hereinbefore described, and returns to its normal position against the stop 76. Such movement of the arm 37 will, as hereinafter stated, automatically reset the governor or fuel supply means 20 of the vehicle engine, whereby the speed of the vehicle is reduced to within a predetermined speed limit, without any action on the part of the driver. When once the speed control device 13 has thus been actuated, the driver cannot again increase the speed of the vehicle beyond a predetermined or safe speed, without first manually resetting the arm 37 of the speed control device 13.

Operating mechanisms 7 and 8

Figure 9:
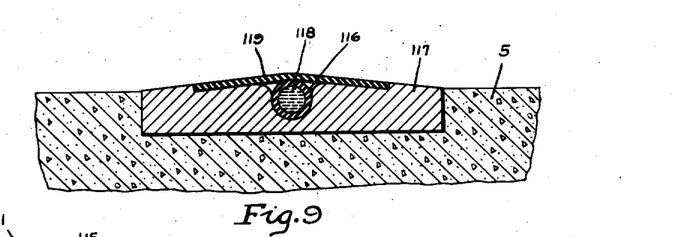
Figure 9 is a cross-sectional view on the line 9—9 of Figure 1, showing the means provided in the surface of the highway adapted to be actuated by the wheels of the vehicle.

The operating mechanisms 7 and 8 also constitute an important feature of the present control system, and are diagrammatically illustrated in Figures 1 and 2. These control mechanisms may be similar in construction, and it will therefore be necessary to describe but one in detail. Each of said mechanisms comprises a deformable tube 116 mounted in a suitable support 117 which preferably is embedded in the surface of the highway, as best shown in Figure 9. The tube 116 contains a suitable inelastic liquid 118 such, for example, as glycerine, and is adapted to be actuated or partially compressed by the wheels of a vehicle, as the latter pass over the support 117. To protect the tube 116 from the elements, it is shown supported beneath a plate 119, of a suitable flexible or bendable material which has been properly treated to withstand the elements and rough usage. The plate element 119 is so arranged that when a wheel passes over it, it will yield and thereby partially compress the tube 116.

The terminal 121 of the tube 116 abuttingly engages an end wall of the support 117, whereby said terminal cannot expand in a direction longitudinally of the tube, when the latter is compressed by the action of a wheel passing thereover. The opposite end of the tube is shown suitably secured to a fixed support 122, to which one end of a suitable diaphragm 123 is also secured, the interior of which communicates with the interior of the tube 116. An actuating rod 124 is secured to the opposite, or movable end of the diaphragm 123 and has secured thereto, in insulated relation, a current conducting section or movable contact 125, best shown in Figure 2. The rod 124 also has an insulated section 126, normally engaged by a pair of flexible contacts 127 and 128. A suitable compression spring 129 is shown interposed between the end of the rod 124 and a fixed support 131, and constantly urges the rod 124 in a direction towards the tube 116, in an attempt to move the insulated section 126 of the rod into a position between the contacts 127 and 128, and thereby break the electrical connection between said contacts. The spring 129 also acts to retain the tube 116 in its normal expanded position, as shown in Figure 9.

When the tube 116 is depressed or partially collapsed, as a result of a wheel engaging the plate 119, the liquid 118 in the tube is displaced and thereby causes the diaphragm 123 to elongate, with the result that the rod 124 is moved in a direction away from the tube 116, whereby the current conducting section or contact 125 thereof is moved into electrical connection with the contact fingers 127 and 128, for purposes which will hereinafter be described. The movable parts of the operating mechanisms 7 and 8 are contained in suitable housings, not shown in the drawings.

The operating mechanisms 7 and 8 automatically control the operations of the warning signal 9 and the magnetic rail 11, and are so arranged and interconnected, that if an automobile passes thereover within a predetermined or safe speed, the warning signal 9 and magnetic rail 11 will not be operated. Should a vehicle, however, pass over the operating mechanisms 7 and 8 at an excessive or dangerous speed, these mechanisms will automatically render the warning signal 9 and magnetic rail 11 operable, whereby the speed control device 13 on the offending vehicle will be actuated, and thereby cause an alarm to be sounded within the vehicle to warn the driver that he is exceeding the speed limit and, at the same time, the ignition circuit of the vehicle engine may be momentarily opened, whereby the driver receives a definite warning that he has committed a traffic violation and that he must immediately reduce the speed of his car or bring it to a complete stop.

*Electrical connections between control devices*

A plurality of time delay switches are shown used in the electrical connections between the operating mechanisms 7 and 8, and the warning signal 9, and the magnetic rail 11, and are generally indicated in the drawings by reference characters A, B, and C. The time delay switch A is shown comprising a solenoid coil 136 which is connected in a wire 133, one end of which is connected to the contact finger 128 of the operating mechanism 7, and the other end to a wire 135 of a supply circuit 130. The contact finger 127 of the operating mechanism 7 has a wire 132 connecting it to the conductor 134 of the supply circuit. The coil 136 has a movable armature 137, one end of which is secured to a bridge member 138 adapted to bridge a gap between the terminals 139 and 141 of a wire 142, connecting the contact 127 of the operating mechanism 8 to the conductor 134 of the supply circuit 130.

The coil 136 of the time delay switch B is connected in the wire 133 of the operating mechanism 8, and its armature is provided with a similar bridge member 138 adapted to close the gap between the contacts 139 and 141 of a wire 146, connecting a relay coil 148 to the conductor 134 of the supply circuit. The time delay switches A and B may be of ordinary well-known construction, and each is provided with means for delaying the return movement of the armature 137, after it has been moved into circuit closing position.

The means for thus delaying the return movement of the armature 137 is here shown as comprising a dash pot 143, which may contain a suitable liquid adapted to be circulated through a small orifice by a plunger secured to the armature 137, during the return movement of said armature, whereby said movement may be retarded to maintain a circuit for a predetermined time interval. It is to be noted that each bridge member 138 is provided with elongated contacts 144 and 145 adapted to engage the terminals 139 and 141 of the wires 142 and 146. The plunger of each dash pot may be provided with a suitable valve, not shown, for permitting the liquid to flow directly therethrough, when the armature is moved into circuit-closing position by energization of the coil 136, whereby such movement of the armature will not be retarded, and whereby the contacts 144 and 145 are substantially instantly moved into circuit-closing position when the coil 136 is energized. Each dash pot 143 is provided with suitable means such as an adjusting screw 147, for controlling the by-passing of the liquid during the return movement of the armature 137, whereby the time delay action of each switch may be accurately controlled. A suitable spring is shown provided in each dash pot for retaining the armature 137 to circuit opening position. These time delay switches, as hereinbefore stated, may be of any well-known construction and it is therefore to be understood that I do not wish to be limited to the particular type herein disclosed.

The relay coil 148 which controls the circuit of the magnetic rail 11, is connected in the supply circuit 130 by the wire 146 and a wire 149 connected to the conductor 135 of the supply circuit 130. The relay coil 148 is normally de-energized because of the bridge member 138 of the switch B being out of electrical connections with the terminals 139 and 141 of the wire 146, as clearly illustrated in Figure 2. A pivoted member 151 carrying a contact 152 is adapted to be actuated by the relay coil 148 when the latter is energized, whereby the contact 152 will bridge the gap between the terminals 153 and 154 of the wires 113 and 155, respectively. The wire 155 is shown electrically connected to one end of a suitable resistance element 156 adapted to be engaged by a movable contact 157, shown mounted for swinging movement and adapted to be actuated by the armature 137 of the time delay switch C. The movable contact 157 is electrically connected to a suitable supply circuit, generally indicated by the numeral 159.

The coil 105 and electric light bulb 106 of the warning signal 9 are shown electrically connected in the system by wires 161 and 162, the wire 161 being shown electrically connected to the wire 146 of the relay coil 148, and the wire 162 to the conductor 135 of the supply circuit 130.

The operation of the warning signal 9 is controlled by the action of the time relay switch B. This switch is normally in the position shown in Figure 2, wherein it will be noted that the circuit to the solenoid 105 and light bulb 106 is open, as a result of the bridge member 138 of the solenoid switch B being out of electrical engagement with the contacts 134 and 141 of the wire 146.

*Manual control*

The manual control is diagrammatically illustrated in Figure 2, and may consist of a suitable rheostat comprising a resistance element 165 having a wire 166 connecting it to the wire 113 of the magnetic rail 11. A pivoted contact member 167 has a wire 168 electrically connecting it to one of the conductors of the supply circuit 159. When the movable contact member 167 of the manual control 12 is in the full line position shown in Figure 2, no current will flow through the resistance 165, and the manual control therefore will have no effect upon the magnetic rail 11. The movable switch member 167 is also retained in circuit opening position when the control system is arranged for automatic operation, whereby the supply of current to the magnetic coils 112 must pass through the movable contact member 157 of the time relay switch C, as will readily be understood by reference to Figure 2. The resistance member 155 and movable contact member 157 of the manual control 12, are preferably enclosed within a suitable housing, which may be supported upon a suitable standard or secured to a post alongside of the highway, whereby it may be conveniently operated by an officer or other authorized person, when it is deemed advisable to manually control the operation of the system. A suitable cutout switch 169 is shown interposed in the main supply circuit 130, and may also be located within the housing of the manual control 12, so that when it is deemed advisable to manually control the system, the operating mechanisms 7 and 8 may be rendered entirely inoperative by opening the main cutout switch 169.

It is to be noted that when the movable contact member 157 of the manual control 112 and the main cutout switch 169 are in circuit opening positions, the entire system is rendered inoperative, whereby repairs and adjustments may readily be made, when necessary.

Operation

In the installation of the novel traffic control system herein disclosed, the various control mechanisms are arranged along the highway in substantially the manner illustrated in Figure 1, although this may be varied to suit conditions. The spacing between the operating mechanisms 7 and 8 may vary in accordance with conditions and, in like manner, the spacing between the operating mechanism 8 and the magnetic control device or rail 11 may also be varied. The control mechanisms 7 and 8 are so arranged and timed that if a vehicle passes over said operating mechanisms within a certain speed as, for example, thirty miles per hour, the circuits to the magnetic rail 11 and also the warning signal 9, will not be completed or closed, whereby these devices remain inoperative, and the vehicle may then pass on without interruption. This results because the spacing between the operating mechanisms 7 and 8 is such that after the wheels of the vehicle have actuated the operating mechanism 7 and caused the time relay switch A to close the gap between the contacts 139 and 141 of the wire 142, the action of the dash pot of said switch A will cause the bridge member 138 thereof to move out of electrical engagement with the contacts 139 and 141 of the wire 142 before the vehicle wheels engage the flexible tube 116 of the operating mechanism 8.

When this occurs, a circuit cannot be completed to the relay coil 148 of the magnetic rail circuit, because the wire 142 of the operating mechanism 8 being open, as a result of the bridge member 138 of the time delay switch A being out of engagement with the contacts 139 and 141 of the wire 142. Consequently, the magnetic rail 11 is not energized, and therefore has no effect upon the pivoted arm 72 of the circuit breaker 70 on the vehicle. On the other hand, should a vehicle pass over the operating mechanisms 7 and 8 at an excessive or dangerous speed, the time relay switch B will close before the switch A opens, whereby the relay 148 is instantly energized and causes the movable contact member 151 to close the gap between the contacts 153 and 154, thereby closing the circuit to the magnetic coils 112 of the magnetic rail 11, so that when the speeding vehicle passes over the magnetic rail, the pivoted switch member 72 of the circuit breaker on the vehicle will be pulled downwardly into circuit opening position and thereby momentarily break the ignition circuit of the engine of the offending vehicle. When the circuit breaker is thus opened, the supply of current to the relay coil 48 of the speed control device 13 is also interrupted, whereby the arm 37 is released and returns to its low speed position in engagement with the stop 76. When the arm 37 engages the stop 76, the hammer 77 carried thereby strikes the gong 81 whereby an alarm is sounded to warn the driver that he is driving at a dangerous speed and that he must apply the brakes of his vehicle and reduce its speed or bring it to a complete stop, as local laws may require.

The dash pot 94 of the circuit breaker 70 on the vehicle may be adjusted to vary the time interval during which the ignition circuit is open. In other words, it may be so adjusted that the ignition circuit may be temporarily maintained open for one second, or, in some cases, it may be found desirable to so adjust the circuit breaker that the ignition circuit will be maintained open for a longer interval of time. Under ordinary conditions, it is adjusted to only momentarily interrupt the ignition circuit. It is to be understood that the circuit breaker 70 on the vehicle is not to be tampered with by unauthorized persons, so that when it is desired to vary the timing thereof, the vehicle must be taken to an authorized or licensed service station, where adjustments may be made which will comply with local traffic rules and regulations. The instrument is preferably sealed against opening by unauthorized persons.

In lieu of the dash pot 94 of the circuit breaker, a suitable time delay relay, not shown, may be interposed in the ignition circuit which, upon actuation of the switch arm 72 by the magnetic rail 11, may temporarily delay the closing of the ignition circuit in a manner similar to the dash pot 94 shown in the drawings. When such a time delay relay is used, the dash pot 94 is, of course, dispensed with.

Upon energization of the relay 148, as above described, the time delay C also functions because of its coil 136 being connected directly across the main line circuit 130, when the bridge member 138 of the switch B is electrically engaged with the terminals 131 and 141 of the wire 136 thereof. Such energization of the coil 136 of the switch C will cause the arm 157 to be moved to the left, when viewed as shown in Figure 2, whereby the resistance 156 may be cut out of the circuit so that the magnetic coils 112 of the rail 11 are energized to their maximum strength. Should the vehicle pass over the magnetic rail 11 when the coils 112 thereof are thus energized, the arm 72 of the circuit breaker 70 is pulled downwardly to the limit of its opening movement, against the stop 98, whereby it may require more time to return to its circuit closing position in engagement with the contact 73. Should the vehicle retard its movement before it passes over the control device 11, the switch arm 157 of the time delay switch C will have partially returned to its normal position, as shown in Figure 2, whereby a portion of the resistance 156 will be interposed in the circuit of the magnetic rail and thereby reduce the magnetic pull of its coils 112, whereby the arm 72 is not pulled downwardly to the limit of its full movement.

Should the speeding vehicle slow down to a safe driving speed before passing over the magnetic rail 11, the bridge element 138 of the time delay switch B may return to its normal open position, as shown in Figure 2, before the vehicle passes over the rail 11, whereby the relay 148 is deenergized, with the result that the contact 152 moves out of engagement with the contacts 153 and 154 and renders the magnetic rail 11 inoperative. When the rail 11 is thus rendered inoperative before the vehicle passes over it, the circuit breaker 70 on the vehicle is not actuated, and the vehicle may then pass on without interruption, as hereinbefore stated. The rail 11 may, however, be so adjusted as to be energized continually, whereby the speed control devices on all cars passing thereover will be operated to limit the speeds of said cars to twenty or thirty miles per hour, should the devices thereon be adjusted for higher speeds.

When the circuit to the relay 148 is closed by operation of the time delay switch B, current is also supplied to the circuit of the warning signal 9, whereby its solenoid coil 105 is energized and thereby causes the hammer 104 to strike the gong 103 with sufficient impact to produce an audible sound which may be heard by the driver of the approaching vehicle. The warning signal 9 is also illuminated because of the light bulb 106 being connected in the circuit thereof, whereby the information appearing upon the front face of the warning signal may readily be read by the driver at all times, regardless of weather conditions. In Figure 11, the warning signal 9 is shown with the word "Slow" on the front face thereof. It is to be understood, however, that other information may be provided thereon as, for example, it may indicate the speed limit permitted when entering the restricted zone 6.

In the drawings, I have shown the various electrical devices comprising two supply circuits 138 and 159. It is to be understood that in some installations it may be found advisable to operate all of the various devices from a single supply circuit. In actual practice, however, it may be found that the time delay switches A, B, and C may be operated by a low voltage circuit as, for example, 12 volts, while the circuit for the magnetic control device 11 is preferably of a higher voltage as, for example, 110 volts. The operation of the entire system, however, will be substantially the same, regardless of whether the various electrical devices are operated from a single supply circuit or from two or more circuits.

The novel traffic control system, herein disclosed, has been designed to meet all of the requirements of a system of this character. It is simple and economical to install along highways, railroad grade crossings, or street intersections, and is adapted for either automatic or manual operation, as may be deemed desirable.

The speed control device 13, mounted within the vehicle, is of utmost importance, as it provides means for positively controlling the speed of the vehicle when approaching or passing through restricted zones or areas. The manner of illuminating the panel 21 will indicate at all times, whether the mechanism of the vehicle is adjusted for safe or fast driving. In other words, when the white or yellow light 29 is illuminating the panel 25, all pedestrians and approaching drivers will know that the governor or fuel supply means of the engine has been adjusted for safe driving.

When the panel 29 is illuminated by the red light, it will indicate to the public that the car is capable of driving at speeds which are prohibitive within certain areas.

Another important feature of the speed control device 13 resides in the fact that regardless of the position of the arm 37, whenever the car passes over a magnetic rail 11 which may be energized, the circuit to the relay coil 48 of the control device 13 will be temporarily deenergized, which will instantly cause the arm 37 to return to its normal low speed position against the stop 76, whereby the governor or fuel control device 20 is automatically adjusted to limit the speed of the car to thirty miles per hour, or any other mileage which may be considered safe, and to which the instrument is adjusted. The sounding of the alarm 81 within the vehicle, whenever the arm 37 is returned to its normal low speed position, is also of utmost importance in that it will call to the driver's attention, the fact that he has been exceeding the speed limit, and that he is approaching an area where careful driving must be exercised. Before the driver may again drive his car at a high rate of speed, he must manually reset the arm 37 of the speed control device 13, by swinging it to the right from the full line position shown in Figure 3. Such movement of the pointer will cause the white or yellow light 29 to be rendered inoperative, whereupon the red light 31 is rendered operative to illuminate the panel 25 with a red glow, whereby pedestrians and approaching motorists are apprised that the particular car is capable of traveling at dangerous speeds.

From the foregoing, it will be noted that the novel traffic control system herein disclosed does not depend entirely upon the driver to retard or slow down his vehicle, when approaching an area or zone along a highway road or street where the speed of the vehicle must be reduced to within a certain limit to avoid accidents. The entire system may be operated automatically, as hereinbefore stated, and will not in any way affect the operation of vehicles traveling within a predetermined speed limit. It is rendered operative only when a vehicle passes over the operating mechanisms 7 and 8 at a speed which is considered excessive and dangerous. When a driver passes over the control devices 7, 8, and 11 at a high rate of speed, he is immediately warned of such speeding as a result of the warning signal 9 being set into operation, and if he then immediately reduces the speed of the vehicle to a safe speed, the magnetic control device will have no effect upon the speed control device 13 of his vehicle, nor the ignition circuit of his engine. If he fails to retard the speed of his vehicle and passes over the control devices at a dangerous speed, the circuit breaker 70 is operated, whereby the ignition circuit of the engine may be temporarily opened, and, at the same time, the speed control device 13 is operated to reset the fuel control means of the vehicle to thereby reduce the speed of the vehicle.

The control system is to be manually operated as hereinbefore stated, when the control switch 169 is open, whereby the operating mechanisms 7 and 8 are rendered inoperative. The supply of current to the coils 112 of the magnetic rail 11 is then obtained through the manual control 12, which is manually operated by an officer or other authorized person stationed along the highway. When the switch arm 167 is in the position shown in Figure 2, all vehicles may pass uninterruptedly over the magnetic rail 11. Should a vehicle approach the restricted zone 6 at a high rate of speed, the officer will move the switch arm 167 into electrical engagement with the resistance 165, whereby the magnetic rail 11 is energized, and will actuate the circuit breaker 70 on the vehicle. Such actuation of the circuit breaker will, as hereinbefore stated, momentarily interrupt the ignition circuit and, at the same time, cause the speed control device 13 to operate.

The magnetic power of the control device 11 may be varied by the resistance 165 of the manual control 12. By varying the resistance imposed in the circuit of the magnetic control device, the degree of opening of the switch arm 72 of the circuit breaker may be varied as, for example, if a car is approaching the control device at a very high rate of speed, the officer may move the switch arm 167 into direct engagement with the contact 171 of the wire 166, whereby all of the resistance 165 is cut out of the circuit, which will cause the magnetic rail 11 to become fully energized, with the result that the arm 72 of the circuit breaker 70 is opened to its full opening. Such opening of the contact arm 72 may cause the ignition circuit to be interrupted for fifteen to twenty seconds, depending upon the adjustment of the circuit breaker. On the other hand, if a vehicle is approaching the restricted zone 6 at a relatively slower speed, but whose speed is still beyond that permitted by law in the given area or district, the officer may manipulate the control 12 so as to cause all of the resistance to be interposed in the circuit, whereupon the effective pull of the magnetic rail 11 is correspondingly decreased, resulting in the switch arm 72 of the circuit breaker being only slightly opened, whereby but a very slight interruption in the ignition circuit is obtained, which, however, is sufficient to cause actuation of the speed control device 13. The degree of opening of the arm 72 of the circuit breaker 70 is controlled by the tension in the spring 97 and the effective magnetic pull of the magnetic rail 11.

From the foregoing, it will be noted that the novel traffic control system herein disclosed, is applicable for substantially all kinds of traffic control. To render this particular system operable in connection with all vehicles, it is to be understood that all vehicles must be provided with a speed control device 13 and a circuit breaker 70. These devices are preferably installed upon the vehicle by authorized agents, and are adjusted to meet the requirements of the various local traffic laws and regulations. They are so constructed and arranged that they cannot be readjusted or reset by the driver or other unauthorized persons without leaving a tell-tale mark.

In the drawings, I have shown the entire system as being electrically operated. It is to be understood, however, that I do not wish to be limited to the specific arrangement shown, as other types of mechanism, applicable for the purpose, may be employed without departing from the scope of the invention.

In Figure 13, I have diagrammatically shown the invention used in connection with a conventional "Stop" and "Go" sign or semaphore, such as are commonly employed at street intersections. In this figure, D represents a street which is intersected by street E. Magnetic rails 11 are embedded in the surface of the pavement at the four approaches to the semaphore, generally indicated by the numeral 172. These rails are so interconnected with the semaphore that when the "Go" lights are on to permit traffic to pass through the intersection on street D, as indicated by arrows, the magnetic rails of street D are deenergized, whereby they will not interfere with the passing of automobiles thereover. When the semaphore 172 is thus positioned to permit traffic to move through the intersection on street D, the magnetic rails of street E are energized to thereby cause actuation of the control devices 13 on all automotive vehicles which may pass over these rails when the "Stop" lights are on to temporarily interrupt traffic on street E at the intersection. When the speed control device 13 of a vehicle is actuated by one of the magnetic rails 11, the alarm adjacent the driver's seat is sounded, whereupon the driver is warned that he must stop his car before entering the intersection against the "Stop" light.

When the semaphore 172 subsequently changes to permit traffic to pass through the intersection on street E the magnetic rails 11 of street D become energized, whereby the speed control devices 13 on all vehicles attempting to enter the intersection with the "Stop" lights against them, may be automatically interrupted because of the magnetic rails 11 of street D causing the speed control devices 13 on all such vehicles to operate and reduce the fuel supplied to the engines thereof.

Many "Stop" and "Go" semaphores are now provided with a warning or change light which is momentarily on, when changing from one signal to another, and which functions to warn drivers and pedestrians that the semaphore is about to change. The magnetic rails are preferably so interconnected in the electric circuit of the semaphore, that when the warning light, which is usually of another color, such as yellow, flashes on to indicate that the semaphore is about to change its signals, the magnetic rails on the street upon which traffic is about to be opened, will be deenergized, and, at the same instance, the magnetic rails on the other street upon which traffic is about to be interrupted, will become energized.

By this arrangement, it will readily be seen that a driver of an automobile cannot readily accidentally pass through an intersection, if the "Stop" signal is against him, for the reason that the speed control device 13 of his car will be operated to warn him that he must slow down or stop his car. If found desirable, the ignition circuit may be connected in the circuit of the speed control device 13, whereby each time the circuit-breaker 70 is operated by the influence of one of the magnetic rails 11, the ignition circuit will be momentarily or temporarily opened to positively warn the driver that he must slow down the movement of his car or in some cases, bring it to a complete stop.

A suitable control box 173 is preferably provided at a suitable location with respect to the semaphore 172, whereby an officer or other authorized person may render any one or all of said magnetic rails 11 inoperable, should it be deemed advisable, and, whereby the magnetic rails may also be manually controlled, if desired.

In Figure 13, I have not shown the electrical connections between the various magnetic rails 11 and the semaphore 172, as it is obvious that the magnetic rails may readily be electrically connected to the semaphore in a manner to cause them to operate as herein described, and it is therefore thought unnecessary to herein illustrate these connections in detail.

I claim as my invention:

1. An automobile speed control device comprising a movable member adapted to be located convenient to the driver's seat and having an operative connection with the automobile engine to control the amount of fuel fed to the engine, said movable member normally occupying a "low speed" position to permit a relatively small amount of fuel to be fed to the engine but being movable manually to a higher speed position to permit a greater amount of fuel to be fed to the engine up to that giving the said higher speed, means for retaining said movable member in said higher speed position, a control element carried by the automobile and adapted to be actuated by an external force, and means connecting said control element to said retaining means so that when said control element is actuated said retaining means is released to permit said movable member to return to normal "low speed" position.

2. An automobile speed control device comprising a movable member adapted to be located convenient to the driver's seat and having an operative connection with the automobile engine to control the amount of fuel fed to the engine, said movable member normally occupying a "low speed" position to permit a relatively small amount of fuel to be fed to the engine but being manually movable to a higher speed position to permit a greater amount of fuel to be fed to the engine up to that giving the higher speed, electromagnetic means for retaining said movable member in said higher speed position, a control element carried by the automobile and adapted to be actuated by an external force, and an electric circuit operated by said control element and including said electromagnetic means so that when said control element is actuated said electromagnetic means is released to permit said movable member to return to normal "low speed" position.

3. An automobile speed control device comprising a movable member adapted to be conspicuously mounted upon the automobile so that it may be readily seen from the interior and exterior of the automobile, said movable member having an operative connection with the automobile engine to control the amount of fuel fed to the engine, indicating means associated with said movable member for indicating the maximum speed at which the automobile may be driven, said movable member normally occupying a "low speed" position to permit a relatively small amount of fuel to be fed to the engine but being movable manually to a higher speed position to permit any desired greater amount of fuel to be fed to the engine up to that giving the said higher speed, electromagnetic means for retaining said movable member in said higher speed position, a control element carried by the automobile and adapted to be actuated by an external force, and an electric circuit operated by said control element and including said electromagnetic means so that when said control element is actuated said electromagnetic means is released to permit said movable member to return to normal "low speed" position.

4. An automobile speed control device comprising a movable member adapted to be conspicuously mounted upon the automobile so that it may be readily seen from the interior and exterior of the automobile, said movable member having an operative connection with the automobile engine to control the amount of fuel fed to the engine, indicating means associated with said movable member for indicating the maximum speed at which the automobile may be driven, said movable member normally occupying a "low speed" position to permit a relatively small amount of fuel to be fed to the engine but being movable manually to a higher speed position to permit any desired greater amount of fuel to be fed to the engine up to that giving the said higher speed, electromagnetic means for retaining said movable member in said higher speed position, a control element carried by the automobile and adapted to be actuated by an external force, an electric circuit operated by said control element and including said electromagnetic means so that when said control element is actuated said electromagnetic means is released to permit said movable member to return to normal "low speed" position, an audible signal means associated with said device, and means for sounding said signal upon the return of said movable member from a higher to said "low speed" position.

5. An automobile speed control device comprising a movable member, said movable member having an operative connection with the automobile engine to control the amount of fuel fed to the engine, indicating means associated with said movable member adapted to be conspicuously mounted upon the automobile so that it may be readily seen from the interior and exterior of the automobile; for indicating the maximum speed at which the automobile may be driven, said movable member normally occupying a "low speed" position to permit a relatively small amount of fuel to be fed to the engine but being manually movable to a higher speed position to permit any desired greater amount of fuel to be fed to the engine up to that giving the said higher speed, electromagnetic means for retaining said movable member in said higher speed position, a control element carried by the automobile and adapted to be actuated by an external force, a pair of contacts adapted to be opened and closed by said control element, and an electric circuit connecting said contacts with said electromagnetic retaining means so that when said control element is actuated said electromagnetic retaining means is released to permit said movable member to return to normal "low speed" position.

6. An automobile speed control device comprising a movable indicator adapted to be located convenient to the driver's seat and movable over a panel to indicate the maximum speed at which the automobile may be driven, said panel and indicator being adapted to be conspicuously mounted so that it may be readily seen from the interior and exterior of the automobile, said indicator having an operative connection with the automobile engine to control the amount of fuel fed to the engine, said movable indicator normally occupying a "low speed" position to permit a relatively small amount of fuel to be fed to the engine but being movable manually to a higher speed position to permit a greater amount of fuel to be fed to the engine up to that giving the said higher speed, electromagnetic means for retaining said movable indicator in said higher speed position, a magnetically operated control element carried by the automobile and adapted to be actuated by an external magnetic force, contacts adapted to be opened and closed by said control element, means connecting said contacts to said electromagnetic retaining means so that when said control element is actuated said electromagnetic retaining means is released to permit said movable indicator to return to normal "low speed" position.

7. An automobile speed control device comprising a panel adapted to be located convenient to the driver's seat and in a conspicuous position so that it may be readily seen from the interior and exterior of the automobile, an indicator movable over said panel and having an operative connection with the automobile engine to control the amount of fuel fed to the engine, said movable indicator normally occupying a "low speed" position on said panel to permit a relatively small amount of fuel to be fed to the engine but being manually movable over said panel to a higher speed position to permit a greater amount of fuel to be fed to the engine up to that giving the higher speed, electro-magnetic means for retaining said movable indicator in said higher speed position, a control element carried by the automobile and adapted to be actuated by an external force, an electric circuit operated by said control element and including said electromagnetic means and the engine ignition circuit so that when said control element is actuated said electromagnetic means is released to permit said movable indicator to return to normal "low speed" position and said engine ignition circuit is interrupted.

8. An automobile speed control device comprising a movable member, said movable member having an operative connection with the automobile engine to control the amount of fuel fed to the engine, visual indicating means associated with said movable member adapted to be conspicuously mounted upon the automobile so that it may be readily seen from the interior and exterior of the automobile for indicating to those inside and outside the automobile the speed at which the automobile may be driven, said movable member normally occupying a "low speed" position to permit a relatively small amount of fuel to be fed to the engine but being movable manually to a higher speed position to permit any desired greater amount of fuel to be fed to the engine up to that giving the said higher speed, electromagnetic means for retaining said movable member in said higher speed position, a control element carried by the automobile and adapted to be actuated by an external force, an electric circuit operated by said control element and including said electromagnetic means and the engine ignition circuit so that when said control element is actuated said electromagnetic means is released to permit said movable member to return to normal "low speed" position and said engine ignition circuit is interrupted.

9. An automobile speed control device comprising a movable member, having an operative connection with the automobile engine to control the amount of fuel fed to the engine, indicating lights associated with said movable member and adapted to be conspicuously mounted upon the automobile so that they may be readily seen from the interior and exterior of the automobile for indicating the speed at which the automobile may be driven, said movable member normally occupying a "low speed" position to permit a relatively small amount of fuel to be fed to the engine but being movable manually to a higher speed position to permit any desired greater amount of fuel to be fed to the engine up to that giving the said higher speed, means for energizing said lights separately in accordance with the position of said movable member, electromagnetic means for retaining said movable member in said higher speed position, a control element carried by the automobile and adapted to be actuated by an external force, and an electric circuit connecting said control element and including said electromagnetic means so that when said control element is actuated said electromagnetic means is released to permit said movable member to return to normal "low speed" position.

10. An automobile speed control device comprising a movable member, having an operative connection with the automobile engine to control the amount of fuel fed to the engine, indicating lights associated with said movable member adapted to be conspicuously mounted upon the automobile so that they may be readily seen from the interior and exterior of the automobile for indicating the speed at which the automobile may be driven, said movable member normally occupying a "low speed" position to permit a relatively small amount of fuel to be fed to the engine but being movable manually to a higher speed position to permit any desired greater amount of fuel to be fed to the engine up to that giving said higher speed, means for energizing said lights separately in accordance with the position of said movable member, means for retaining said movable member in said higher speed position, a control element carried by the automobile and adapted to be actuated by an external force, an electric circuit operated by said control element and including said retaining means so that when said control element is actuated said retaining means is released to permit said movable member to return to normal "low speed" position, an audible signal means associated with said device, and means for sounding said signal upon the return of said movable member from a higher to said "low speed" position.

11. An automobile speed control device comprising a movable member, having an operative connection with the automobile engine to control the amount of fuel fed to the engine, a plurality of different colored lights associated with said movable member and adapted to be energized individually to indicate the speed at which the automobile may be driven, said lights being adapted to be conspcuously mounted upon the automobile so that they may be readily seen from the interior and exterior of the automobile, said movable member normally occupying a "low speed" position to permit a relatively small amount of fuel to be fed to the engine but being manually movable to a higher speed position to permit any desired greater amount of fuel to be fed to the engine up to that giving the said higher speed, means for energizing said lights individually in accordance with the position of said movable member, means for retaining said movable member in said higher speed position, a control element carried by the automobile and adapted to be actuated by an external magnetic force, a pair of contacts adapted to be opened and closed by said control element, and an electric circuit operated by said contacts and including said retaining means so that when said control element is actuated said retaining means is released to permit said movable member to return to normal "low speed" position.

12. An automobile speed control device comprising a movable member adapted to be located convenient to the driver's seat and having an operative connection with the automobile engine to control the amount of fuel fed to the engine, said movable member normally occupying a "low speed" position to permit a relatively small amount of fuel to be fed to the engine but being movable manually to a higher speed position to permit a greater amount of fuel to be fed to the engine, means visible to the driver and to others not in the automobile indicating the position of said movable member, electromagnetic means for retaining said movable member in adjusted position, a control element carried by the automobile and adapted to be actuated by an external force, said control element having circuit opening and closing means electrically connected with said electromagnetic means and adapted when actuated to operate said electromagnetic means and permit said movable member to return to normal "low speed" position, and means for sounding an audible signal upon the return of said movable member to said normal position.

13. In a traffic control system for automobiles, a speed control device on the vehicle including a member having an operative connection with the fuel supply of the vehicle engine for varying the amount of fuel fed to the engine, said member normally occupying a "low speed" position to feed a relatively small amount of fuel to the engine but being movable manually to a higher speed position to permit any desired greater amount of fuel to be fed to the engine up to that giving the said higher speed, means for retaining said movable member in said higher speed position, a control element carried by the vehicle and adapted to be actuated by an external force, and means connecting said control element to said retaining means so that when said control element is actuated said retaining means is released to permit said movable member to return to normal "low speed" position and thereby reduce the amount of fuel fed to the engine.

14. In a traffic control system for automobiles, a speed control device on the vehicle including a member having an operative connection with the fuel supply of the vehicle engine for varying the amount of fuel fed to the engine, said member normally occupying a "low speed" position to feed a relatively small amount of fuel to the engine but being movable manually to a higher speed position to permit any desired greater amount of fuel to be fed to the engine up to that giving the said higher speed, signal means visible to the driver and to others not in the automobile indicating whether the automobile may be driven fast or slowly, means for retaining said movable member in said higher speed position, means for operating the corresponding higher speed signal, a magnetically actuated control element carried by the vehicle and adapted to be actuated by an external magnetic force, means operated by said control element and including said retaining means so that when said control element is actuated said retaining means is released to permit said movable member to return to normal "low speed" position and operating the corresponding low speed signal.

15. In a traffic control system for automobiles, a speed control device on the vehicle including a member having an operative connection with the fuel supply of the vehicle engine for varying the amount of fuel fed to the engine, said member normally occupying a "low speed" position to feed a relatively small amount of fuel to the engine but being movable manually to a higher speed position to permit any desired greater amount of fuel to be fed to the engine up to that giving the said higher speed, signal means visible and audible to the driver and visible to others not in the automobile to indicate whether the automobile may be driven fast or slowly, means for retaining said movable member in said higher speed position, a magnetically actuated control element carried by the vehicle and adapted to be actuated by an external force, means connecting said control element to said retaining means so that when said control element is actuated said retaining means is released to permit said movable member to return to normal "low speed" position and operate said signal means and momentarily sound the audible signal.

16. In a traffic control system for automobiles, a speed control device on the vehicle including a member having an operative connection with the fuel supply of the vehicle engine for varying the amount of fuel fed to the engine, said member normally occupying a "low speed" position to feed a relatively small amount of fuel to the engine but being movable manually to a higher speed position to permit any desired greater amount of fuel to be fed to the engine up to that giving the said higher speed, indicating lights associated with said movable member for indicating the speed at which the automobile may be driven, means for retaining said movable member in said higher speed position, a magnetically actuated control element carried by the vehicle and adapted to be actuated by an external magnetic force, means for energizing said lights separately in accordance with the position of said movable member, and means connecting said control element to said retaining means so that when said control element is actuated said retaining means is released to permit said movable member to return to normal "low speed" position.

JOHN J. HUEBSCHER.